United States Patent
Boliek et al.

(10) Patent No.: US 7,581,027 B2
(45) Date of Patent: Aug. 25, 2009

(54) JPEG 2000 FOR EFFICENT IMAGING IN A CLIENT/SERVER ENVIRONMENT

(75) Inventors: Martin Boliek, San Francisco, CA (US); Kok Gi Wu, Daly City, CA (US); Michael J. Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 633 days.

(21) Appl. No.: 09/894,524

(22) Filed: Jun. 27, 2001

(65) Prior Publication Data
US 2003/0018818 A1 Jan. 23, 2003

(51) Int. Cl.
G06F 15/16 (2006.01)

(52) U.S. Cl. .................. 709/247; 709/246; 709/201; 709/203

(58) Field of Classification Search ............. 707/8; 345/760; 348/384.1; 382/287, 251; 715/530, 715/716–725; 709/246–247, 203, 201; 358/453
See application file for complete search history.

(56) References Cited

U.S. PATENT DOCUMENTS

| | | | |
|---|---|---|---|
| 3,580,655 | A | 5/1971 | Leith et al. |
| 3,950,103 | A | 4/1976 | Schmidt-Weinmar |
| 4,136,954 | A | 1/1979 | Jamieson |
| 4,155,097 | A | 5/1979 | Lux |
| 4,190,861 | A | 2/1980 | Lux |
| 4,223,354 | A | 9/1980 | Noble et al. |
| 4,393,456 | A | 7/1983 | Marshall, Jr. |
| 4,437,087 | A | 3/1984 | Petr |
| 4,569,075 | A | 2/1986 | Nussbaumer |
| 4,599,567 | A | 7/1986 | Goupillaud et al. |
| 4,652,881 | A | 3/1987 | Lewis |
| 4,663,660 | A | 5/1987 | Fedele et al. |

(Continued)

FOREIGN PATENT DOCUMENTS

EP 0510933 A1 10/1992

(Continued)

OTHER PUBLICATIONS

IEEE—Maher et al. "Thirteenth IEEE Symposium on Mass Storage Systems—The integration of Distributed File System and Mass Storage System", Jun. 12-16, 1994, pp. 27-31.*

(Continued)

*Primary Examiner*—Kenny S Lin
*Assistant Examiner*—Lan-Dai T Truong
(74) *Attorney, Agent, or Firm*—Blakely, Sokoloff, Taylor & Zafman LLP

(57) ABSTRACT

In one embodiment, the system comprises a server and a client. The server stores a compressed codestream corresponding to image data. The client is coupled to the server via a network environment. The client includes a memory having an application and a data structure stored therein. The data structure identifies positions of packets of the compressed codestream on the server and identifies data of the compressed codestream already buffered at the client. The client requests bytes of the compressed codestream from the server that are not already stored in the memory and generates decoded image data requested by a user from the bytes of the compressed codestream requested from the server and any portion of the compressed codestream previously stored in the memory necessary to create the image data.

27 Claims, 5 Drawing Sheets

U.S. PATENT DOCUMENTS

| | | | |
|---|---|---|---|
| 4,674,125 A | 6/1987 | Carlson et al. | |
| 4,701,006 A | 10/1987 | Perlmutter | |
| 4,751,742 A | 6/1988 | Meeker | |
| 4,760,563 A | 7/1988 | Beylkin | |
| 4,785,348 A | 11/1988 | Fonsalas et al. | |
| 4,785,349 A | 11/1988 | Keith et al. | |
| 4,799,179 A | 1/1989 | Masson et al. | |
| 4,805,129 A | 2/1989 | David | |
| 4,815,023 A | 3/1989 | Arbeiter | |
| 4,817,182 A | 3/1989 | Adelson et al. | |
| 4,821,223 A | 4/1989 | David | |
| 4,827,336 A | 5/1989 | Acampora et al. | |
| 4,829,378 A | 5/1989 | Le Gall | |
| 4,837,517 A | 6/1989 | Barber | |
| 4,839,889 A | 6/1989 | Gockler | |
| 4,858,017 A | 8/1989 | Torbey | |
| 4,864,398 A | 9/1989 | Avis et al. | |
| 4,868,868 A | 9/1989 | Yazu et al. | |
| 4,881,075 A | 11/1989 | Weng | |
| 4,894,713 A | 1/1990 | Delogne et al. | |
| 4,897,717 A | 1/1990 | Hamilton et al. | |
| 4,899,147 A | 2/1990 | Schiavo et al. | |
| 4,904,073 A | 2/1990 | Lawton et al. | |
| 4,918,524 A | 4/1990 | Ansari et al. | |
| 4,922,544 A | 5/1990 | Stansfield et al. | |
| 4,929,223 A | 5/1990 | Walsh | |
| 4,929,946 A | 5/1990 | O'Brien et al. | |
| 4,936,665 A | 6/1990 | Whitney | |
| 4,973,961 A | 11/1990 | Chamzas et al. | |
| 4,974,187 A | 11/1990 | Lawton | |
| 4,982,283 A | 1/1991 | Acampora | |
| 4,985,927 A | 1/1991 | Norwood et al. | |
| 4,987,480 A | 1/1991 | Lippman et al. | |
| 4,999,705 A | 3/1991 | Puri | |
| 5,000,183 A | 3/1991 | Bonnefous | |
| 5,001,764 A | 3/1991 | Wood et al. | |
| 5,014,134 A | 5/1991 | Lawton et al. | |
| 5,018,210 A | 5/1991 | Merryman et al. | |
| 5,049,992 A | 9/1991 | Citta et al. | |
| 5,049,993 A | 9/1991 | Le Gall et al. | |
| 5,068,911 A | 11/1991 | Resnikoff et al. | |
| 5,072,308 A | 12/1991 | Lin et al. | |
| 5,073,964 A | 12/1991 | Resnikoff | |
| 5,081,645 A | 1/1992 | Resnikoff et al. | |
| 5,095,447 A | 3/1992 | Manns et al. | |
| 5,097,261 A | 3/1992 | Langdon, Jr. et al. | |
| 5,097,331 A | 3/1992 | Chen et al. | |
| 5,101,280 A | 3/1992 | Moronaga et al. | |
| 5,101,446 A | 3/1992 | Resnikoff et al. | |
| 5,103,306 A | 4/1992 | Weiman et al. | |
| 5,109,451 A | 4/1992 | Aono et al. | |
| 5,121,191 A | 6/1992 | Cassereau et al. | |
| 5,124,930 A | 6/1992 | Nicolas et al. | |
| 5,128,757 A | 7/1992 | Citta et al. | |
| 5,128,791 A | 7/1992 | Le Gall et al. | |
| 5,148,498 A | 9/1992 | Resnikoff et al. | |
| 5,152,953 A | 10/1992 | Ackermann | |
| 5,156,943 A | 10/1992 | Whitney | |
| 5,173,880 A | 12/1992 | Duren et al. | |
| 5,182,645 A | 1/1993 | Breeuwer et al. | |
| 5,223,926 A | 6/1993 | Stone et al. | |
| 5,235,434 A | 8/1993 | Wober | |
| 5,241,395 A | 8/1993 | Chen | |
| 5,262,958 A | 11/1993 | Chui et al. | |
| 5,276,525 A | 1/1994 | Gharavi | |
| 5,315,670 A | 5/1994 | Shapiro | |
| 5,321,776 A | 6/1994 | Shapiro | |
| 5,335,016 A | 8/1994 | Nakagawa | |
| 5,347,479 A | 9/1994 | Miyazaki | |
| 5,349,348 A | 9/1994 | Anderson et al. | |
| 5,379,355 A | 1/1995 | Allen | |
| 5,381,145 A | 1/1995 | Allen et al. | |
| 5,384,869 A | 1/1995 | Wilkinson et al. | |
| 5,412,741 A | 5/1995 | Shapiro | |
| 5,414,780 A | 5/1995 | Carnahan | |
| 5,416,604 A | 5/1995 | Park | |
| 5,420,891 A | 5/1995 | Akansu | |
| 5,442,458 A | 8/1995 | Rabbani et al. | |
| 5,453,945 A | 9/1995 | Tucker et al. | |
| 5,455,874 A | 10/1995 | Ormsby et al. | |
| 5,481,308 A | 1/1996 | Hartung et al. | |
| 5,495,292 A | 2/1996 | Zhang et al. | |
| 5,497,435 A | 3/1996 | Berger | |
| 5,511,151 A | 4/1996 | Russell et al. | |
| 5,534,925 A | 7/1996 | Zhong | |
| 5,537,493 A | 7/1996 | Wilkinson | |
| 5,541,594 A | 7/1996 | Huang et al. | |
| 5,546,477 A | 8/1996 | Knowles et al. | |
| 5,563,960 A | 10/1996 | Shapiro | |
| 5,566,089 A | 10/1996 | Hoogenboom | |
| 5,602,589 A | 2/1997 | Vishwanath et al. | |
| 5,631,977 A | 5/1997 | Koshi | |
| 5,638,498 A | 6/1997 | Tyler et al. | |
| 5,657,085 A | 8/1997 | Katto | |
| 5,701,367 A | 12/1997 | Koshi et al. | |
| 5,717,789 A | 2/1998 | Anderson et al. | |
| 5,754,793 A | 5/1998 | Eom et al. | |
| 5,808,683 A | 9/1998 | Tong et al. | |
| 5,809,176 A | 9/1998 | Yajima | |
| 5,818,364 A * | 10/1998 | Hintzman et al. | 341/65 |
| 5,850,482 A | 12/1998 | Meany et al. | |
| 5,867,602 A | 2/1999 | Zandi et al. | |
| 5,880,856 A | 3/1999 | Ferriere | |
| 5,966,465 A | 10/1999 | Keith et al. | |
| 6,020,975 A | 2/2000 | Chen et al. | |
| 6,026,198 A | 2/2000 | Okada | |
| 6,088,062 A | 7/2000 | Kanou et al. | |
| 6,101,279 A | 8/2000 | Nguyen et al. | |
| 6,118,902 A | 9/2000 | Knowles | |
| 6,121,970 A | 9/2000 | Guedalia | |
| 6,128,413 A | 10/2000 | Benamara | |
| 6,160,846 A | 12/2000 | Chiang | |
| 6,201,897 B1 | 3/2001 | Nixon | |
| 6,229,929 B1 | 5/2001 | Lynch et al. | |
| 6,236,765 B1 | 5/2001 | Acharya | |
| 6,237,010 B1 | 5/2001 | Hui et al. | |
| 6,263,109 B1 | 7/2001 | Ordentlich et al. | |
| 6,263,120 B1 | 7/2001 | Matsuoka | |
| 6,327,392 B1 | 12/2001 | Li | |
| 6,330,666 B1 | 12/2001 | Wise et al. | |
| 6,339,658 B1 | 1/2002 | Moccagatta et al. | |
| 6,350,989 B1 | 2/2002 | Lee et al. | |
| 6,356,283 B1 * | 3/2002 | Guedalia | 345/760 |
| 6,356,668 B1 | 3/2002 | Honsinger et al. | |
| 6,466,698 B1 | 10/2002 | Creusere | |
| 6,483,946 B1 | 11/2002 | Martucci et al. | |
| 6,535,878 B1 * | 3/2003 | Guedalia et al. | 707/8 |
| 6,546,143 B1 | 4/2003 | Taubman et al. | |
| 6,625,321 B1 | 9/2003 | Li et al. | |
| 6,650,782 B1 | 11/2003 | Joshi et al. | |
| 6,668,090 B1 | 12/2003 | Joshi et al. | |
| 6,708,309 B1 * | 3/2004 | Blumberg | 715/530 |
| 6,747,762 B1 * | 6/2004 | Josephsen et al. | 358/453 |
| 6,904,178 B2 * | 6/2005 | Boliek et al. | 382/251 |
| 2001/0021223 A1 | 9/2001 | Andrew | |
| 2001/0028404 A1 * | 10/2001 | Fukuhara et al. | 348/384.1 |
| 2001/0047517 A1 | 11/2001 | Christopoulos et al. | |
| 2002/0057446 A1 * | 5/2002 | Long et al. | 358/1.13 |
| 2002/0087728 A1 * | 7/2002 | Deshpande et al. | 709/246 |
| 2002/0159653 A1 * | 10/2002 | Dekel et al. | 382/282 |
| 2003/0018818 A1 * | 1/2003 | Boliek et al. | 709/247 |

| | | | |
|---|---|---|---|
| 2003/0110299 | A1* | 6/2003 | Larsson et al. .............. 709/247 |

FOREIGN PATENT DOCUMENTS

| | | |
|---|---|---|
| EP | 0593013 A2 | 4/1994 |
| EP | 0611051 A1 | 8/1994 |
| EP | 0622741 A2 | 11/1994 |
| EP | 701375 A2 | 3/1996 |
| EP | 0 967 556 A2 | 10/1999 |
| EP | 0967556 A2 | 12/1999 |
| EP | 1035511 A2 | 9/2000 |
| EP | 1164781 A1 | 12/2001 |
| GB | 2 211 691 A | 7/1989 |
| GB | 2 284 121 A | 5/1995 |
| GB | 2 285 374 A | 7/1995 |
| GB | 2 293 733 A | 4/1996 |
| GB | 2 293 734 A | 4/1996 |
| GB | 2 303 030 A | 2/1997 |
| GB | 2 303 031 A | 2/1997 |
| GB | 2 341 035 A | 3/2000 |
| JP | 406038193 A | 7/1992 |
| JP | 06-245077 | 9/1994 |
| JP | 6-350989 | 12/1994 |
| JP | 7-79350 | 3/1995 |
| JP | 10-222699 | 8/1998 |
| JP | H11-088662 | 3/1999 |
| JP | 11-155144 | 8/1999 |
| JP | 2000-69442 | 3/2000 |
| JP | 2000-078576 | 3/2000 |
| WO | WO 88/10049 | 12/1988 |
| WO | WO 91/03902 | 3/1991 |
| WO | WO 91/18361 | 11/1991 |
| WO | WO 93/10634 | 5/1993 |
| WO | WO 94/17492 | 8/1994 |
| WO | WO 94/23385 | 10/1994 |
| WO | WO 95/19683 | 7/1995 |
| WO | WO 96/09718 | 3/1996 |
| WO | WO 00/49571 | 8/2000 |
| WO | WO 01/16764 A1 | 3/2001 |

OTHER PUBLICATIONS

Wu, G.K., et al., "New Compression Paradigms in JPEG2000"., Applications of Digital Image Processing XXIII, San Diego, CA USA, Jul. 31-Aug 3, 2000, vol. 4115, pp. 418-429, XP008013391, Proceedings ofteh DPIE—The International Society for Optical Engineering, 2000, SPIE-Int. Soc. Opt. Eng., USA.

Boliek, M., et al., "JPEG 2000 for Efficient Imaging In a Client/ Server Environment", Proceeding of the PIE, SPIE, Bellingham, VA, US, vol. 4472, Jul. 31, 2001, pp. 212-223, XP008010308.

Marcellin, M.W., et al., "An Overview of JPEG-2000", Proceedings. DCC 2000 Snowbird, UT, USA, Mar. 28-30, 2000, pp. 523-541, XP010377392.

Sachin Deshpande and Wenjun Zeng, "HTTP Streaming of JPEG 2000 Images", *IEEE*(2001), pp. 15-19.

"JPEG 2000 Part I Final Committee Draft Version 1.0", ISO/IEC FCD15444-1:2000 (V1.0, Mar. 16, 2000), pp. 13-52.

Martin Boliek, Michael J. Gormish, Edward L. Schwartz, and Keith, "Decoding compression with reversible embedded wavelets (CREW) codestreams", *Journal of Electronic Imagine*, Jul. 1998, vol. 7(3), pp. 402-409.

Robert Blumberg and Peter Huges, "Visual Realism and Interativity for the Internet", *IEEE* (1997), pp. 269-273.

Christopher R. Hauf and J. Scott Houchin, "The FlashPix™ Image File Format", *The Fourth Color Imaging Conference: Color Science, Systems and Application* (1996), pp. 234-238.

Antonini, et al., "Image Coding Using Wavelet Transform", *IEEE Transactions on Image Processing*, vol. 1, No. 2, Apr. 1992, pp. 205-220.

Blumberg, et al., "Visual Realism and Interativity for the Internet", IEEE, 1997, pp. 269-273.

Boliek, et al., "Decoding compression with reversible embedded wavelets (CREW) codestreams", Journal of Electronic Imaging, Jul. 1998, vol. 7 (3), pp. 402-409.

Boliek, et al., "JPEG 2000 for Efficient Imaging in a Client/Server Environment", Proceeding of the PIE, SPIE, Bellingham, VA, US, vol. 4472, Jul. 31, 2001, pp. 212-223, XP008010308.

Boliek, et al., "JPEG 2000 Next Generation Image Compression System", IEEE 0-7803-6297, 45-48.

Calderbank, et al., "Wavelet Transforms That Map Integers to Integers", Aug. 1996.

Carey, et al: "Regularity-Preserving Image Interpolation", IEEE Transactions on Image Processing, vol. 8., No. 9, Sep. 1999, pp. 1293-1297, XP002246254.

Carrato, et al: "A Simple Edge-Sensitive Image Interpolation Filter", Proceedings of the International Confrence on Image Processing (ICIP) Lausanne, Sep. 16-19, 1996, New York, IEEE, US, vol. 1, pp. 711-714, XP010202493.

Chen, et al., "Wavelet Pyramid Image Coding with Predictable and Controllable Subjective Picture Quality", *IEICE Trans. Fundamentals*, vol. E76-A., No. 9, Sep. 1993, pp. 1458-1468.

Cheong, et al., "Subband Image Coding with Biorthogonal Wavelets", *IEICE Trans. Fundamentals*, vol. E75-A., No. 7, Jul. 1992, pp. 871-881.

Chrysafis, et al., "An Algorith for Low Memory Wavelet Image Compression", IEEE 0-7803-5467-2/99, pp. 354-358.

Chrysafis, et al., "Line Based Reduced Memory, Wavelet Image Compression," Data Compression Conference, 1998, DCC '98, Proceedings Snowbird, UT, Mar. 1998, pp. 398-407.

Chui, et al., "Wavelets on a Bounded Interval", *Numerical Methods of Approximation Theory*, vol. 9, 1992, pg. 53-75.

Crochiere, et al., "Digital Coding of Speech in Sub-bands", 1976, American Telephone and Telegraph Company, The Bell System Technical Journal, vol. 55, No. 8, Oct. 1976, p. 1069-1085.

Denk, et al., "Architectures for Lattice Structure Based Orthonormal Discrete Wavelet Transforms", *IEEE*, 1994, pp. 259-270.

Deshpande, et al., "HTTP Streaming of JPEG2000 Images", IEEE, 2001, pp. 15-19.

Dutch Search Report, 133082, Nov. 26, 1996.

Esteban, et al., "1977 IEEE International Conference on Acoustics, Speech & Signal Processing", "Application of Quadrature Mirror Filters to Split Band Voice Coding Schemes", pp. 191-195.

French Search Report, FR9511023, Nov. 26, 1996.

French Search Report, FR9511024, Nov. 26, 1996.

German Search Report, Dated Mar. 21, 1997, 3 pages.

Gharavi, et al., "Proceedings: ICASSP 87", 1987 International Conference on Acoustics, Speech, and Signal Processing, Apr. 6,7,89,9, 1987, vol. 4 of 4, "Application of Quadrature Mirror Filtering to the Coding of Monochrome and Color Images", pp. 2384-2387.

Gharavi, et al., "Sub-band Coding of Digital Images Using Two-Dimensional Quadrature Mirror Filtering:, SPIE vol. 707 Visual Communications and Image Processing", 1986, p. 51-61.

Gordon, Benjamin M., et al., "A 1.2 mW Video-Rate 2-D Color Subband Decoder," IEEE Journal of Solid-State Circuits, IEEE Inc. New York, vol. 30, No. 12, Dec. 1, 1995, pp. 1510-1516.

Hauf, et al., "The FlashPix™ Image File Format", The Fourth Color Imaging Conference: Color Science, Systems and Application, 1996, pp. 234-238.

Howard, et al., "Fast and Efficient Lossless Image Compression", *IEEE*, 1993, pp. 351-360.

Information Technology—JPEG 2000 Image Coding System—Part 1: Core Coding System, ISO/IEC 15444-1, Dec. 15, 2000, pp. 5, 14, 22.

International Search Report for Application No. GB 9518298.6, dated Nov. 8,1995.

JPEG 2000 Part 1 Final Committee Draft Version 1.0, Image Compression Standard described in ISO/IEC 1/SC 29/WG 1 N1646, Mar. 16, 2000.

Komatsu, et al., "Reversible Subband Coding of Images", SPIE vol. 2501, pp. 676-648.

Langdon, Jr., "Sunset: A Hardware-Oriented Algorithm for Lossless Compression of Gray Scale Images", *SPIE vol. 1444, Image Capture, Formatting, and Display*, 1991, pp. 272-282.

Le Gall, et al., "Sub-band coding of Digital Images Using Symmetric Short Kernal Filters and Arithmetic Coding Techniques", 1988, International Conference on Acoustics, Speech and Signal Processing, pp. 761-764.

Lewis, et al., "Image Compression Using the 2-D Wavelet Transform", *IEEE Transactionw on Image Processing*, vol. 1, No. 2, Apr. 1992, pp. 244-250.

Lux, P., "A Novel Set of Closed Orthogonal Functions for Picture Coding", 1977, pp. 267-274.

Marcellin, et al., "An Overview of JPEG-2000", Proceedings. DCC 2000 Snowbird, UT, USA, Mar. 28-30, 2000, pp. 523-541, XP010377392.

Meng, Teresa H., "A Wireless Portable Video-on-Demand System," VLSI Design, 1998, Proceedings Eleventh International Conference on Chennai, India 407, Jan. 1998, California, pp. 4-9.

Ohta, et al., "Wavelet Picture Coding with Transform Coding Approach", Jul. 1992, No. 7, pp. 776-784.

Padmanabhan, et al., "Feedback-Based Orthogonal Digital Filters", *IEEE Transactions on Circuits and Systems*, Aug. 1993, No. 8, pp. 512-525.

Pollara et al., "Rate-distortion Efficiency of Subband Coding with Integer Coefficient Filters", Jul. 1994, pp. 419, Information Theory, 1994, IEEE.

Reeves, et al: "Multiscale-Based Image Enhancement", Electrical and Computer Engineering, 1997. Engineering Innovation: Voyage of Discovery. IEEE 1997 Canadian Conference on St. Johns, NFLD., Canada May 25-28, 1997, New York, NY. (pp. 500-503), XP010235053.

Reusens, "New Results in Subband/Wavelet Image Coding", May 1993, pp. 381-385.

Said, et al., "Image Compression Using the Spatial-Orientation Tree", *IEEE*, 1993, pp. 279-282.

Said, et al., "Reversible Image Compression Via Multiresolution representation and Predictive Coding", Aug. 11, 1993, pp. 664-674.

Shah, et al., "A Chip Set for Lossless Image Compression", *IEEE Journal of Solid-State Circuits*, vol. 26, No. 3, Mar. 1991, pp. 237-244.

Shapiro, J. M., "An Embedded Hierarchical Image Coder Using Zerotrees of Wavelet Coefficients", *IEEE*, 1993, pp. 214-223.

Shapiro, J. M., "Embedded Image Coding Using Zerotrees of Wavelet Coefficients", *IEEE Transactions on Signal Processing*, Dec. 1993, No. 12, pp. 3445-3462.

Smith, et al., "Exact Reconstruction Techniques for Tree-Structured Subband Coders", IEEE Transactions on Acoustics, Speech, and Signal Processing, vol. ASSP-34, No. 3, Jun. 1986, pp. 434-441.

Stoffel, et al: "A Survey Of Electronic Techniques For Pictorial Image Reproduction," IEEE Transactions On Communications, vol. COM-29, No. 12. Dec. 1981, pp. 1898-1925, XP000560531 IEEE, New York (US).

Szu, et al., "Image Wavelet Transforms Implemented by Discrete Wavelet Chips", *Optical Engineering*, Jul. 1994, vol. 33, No. 7, pp. 2310-2325.

Vetterli, Martin, "Filter Banks Allowing Perfect Reconstruction", Signal Processing 10 (1986), pp. 219-244.

Vetterli, Martin, "Multi-Dimensional Sub-band Coding: Some Theory and Algorithms", Signal Processing 6 (1984) pp. 97-112.

Villasenor, et al., "Filter Evaluation and Selection in Wavelet Image Compression", *IEEE*, 1994, pp. 351-360.

Westernick, et al., "Proceedings: ICASSP 87", 1987 International Conference on Acoustics, Speech, and Signal Processing, Apr. 6, 7, 8, 9, 1987, vol. 3 of 4, "Sub-band coding of Images Using Predictive Vector Quantization", pp. 1378-1381.

Woods, "Subband Image Coding", 1991, pp. 101-108, 163-167, and 180-189.

Woods, et al., "Subband Coding of Images", *IEEE Transactions on Acoustics, Speech, And Signal Processing*, vol. 1 ASSP-34, No. 5, Oct. 1986, pp. 1278-1288.

Woods, et al., "Sub-band coding of Images", Proceedings ICASSP 86, Tokyo, Japan, Apr. 1986, p. 1005-1008.

Wu, et al., "New Compression Paradigms in JPEG2000", Applications of Digital Image Processing XXIII, San Diego, CA USA, Jul. 31-Aug 3, 2000, vol. 4115, pp. 418-429, XP008013391, Proceedings of the DPIE—The International Society for Optical Engineering, 2000, SPIE-Int. Soc. Opt. Eng., USA.

Xiong, et al., "Joint Optimization of Scalar and Tree-structured Quantization of Wavelet Image Decompositions", Jan. 11, 1993, pp. 891-895.

"Scaling of JPEG Video", Collected essays on the lecture on Information System Society by Institute of Electronics and Communication in 1996. (Published on Aug. 30, 1996); Institute of Electronics and Communication, D-252, p. 254. (Especially "3 Hierarchization of dynamic picture image, JPEG and reference on diagram fig.2").

Deshpande, S., "HTTP Streaming of JPEG2000 Images", Proceedings International Conference on Information Technology: Coding and Computing 2001, Apr. 2, 2001, IEEE, p. 15-19.

Japanese Office Action dated Jan. 6, 2009; JP Patent Application No. 2002-081402, 4 pgs.

Flashpix Format Specification, Version 1.0.2, Jul. 2, 1998 Copyright 1997 Digital Imaging Group.

Internet Imaging Protocol, Version 1.0.5, Oct. 1997 Copyright 1997 Hewlett Packard Company, Live Pictures, Inc., and Eastman Kodak Company.

XSL Transformations (XSLT), Version 1.0, W3C Recommendation Nov. 16, 1999 by the W3C.

* cited by examiner

JPEG 2000 FOR EFFICENT IMAGING IN A CLIENT/SERVER ENVIRONMENT

FIELD OF THE INVENTION

The present invention relates to the field of client/server systems; more particularly, the present invention relates to client/server systems that provide for imaging a JPEG 2000 codestream.

BACKGROUND OF THE INVENTION

Digital image processing has undergone two significant evolutions in the 1990s. First, digital images are generally becoming higher resolution and higher quality. The consumer has access to near-photographic quality three megapixel digital cameras, for example. Scanners and printers of 600 dpi, or higher, are commonplace. Second, with the advent of the "populist" Internet and wireless technology, high speed networking now connects many types of heterogeneous display devices.

Image compression is vital as image size grows. However, because of the need to serve many different types of display devices with the same type of image, a new kind of image compression is required—image compression that is flexible at transmission and decode, not just encode. The JPEG 2000 image coding standard, ITU-T Rec.T.800/ISO/IEC 154441: 2000 JPEG 2000 Image Coding System, allows one encoded image to be decoded at different resolutions, bit-rates, and with different regions without decoding any more than the minimum necessary amount of data.

The JPEG 2000 standard divides an image into tiles (rectangular regions), wavelet transform decompositions (different resolutions), codes coefficient bit-planes called layers (progressive bit-rate), components (e.g., R, G, B), and precincts (regions of wavelet coefficients). These tile-resolution-layers-component-precinct units are independently coded into JPEG 2000 packets. These packets can be identified and extracted from the codestream without decoding. This allows only the data required by a given display to be extracted and transmitted. For example, a monitor might require only 75 dpi data at a high quality while a printer might require 600 dpi data at a low quality. Both could be accommodated from one codestream.

The CREW image compression system served as a prototype for the features contained in the JPEG 2000 standard. For more information, see M. Boliek, M. J. Gormish, E. L. Schwartz, A. Keith, "Decoding compression with reversible embedded wavelets (CREW) codestreams," Electronic Imaging, Vol. 7, No. 3, July 1998. An earlier paper on JPEG 2000 codestream "parsing" shows how to access, extract, and rearrange the data in a JPEG 2000 codestream. For more information, see G. K. Wu, M. J. Gormish, M. Boliek, "New Compression Paradigms in JPEG2000," SPIE San Diego, July 2000. Another paper on JPEG 2000 codestream syntax shows how a codestream could be arranged for progressive transmission for a specific user interaction. For more information, see M. Boliek, J. S. Houchin, G. Wu, "JPEG 2000 Next Generation Image Compression System Features and Syntax," Int. Conf. On Image Processing 2000, Vancouver, Canada, 12 Sep. 2000.

JPEG 2000 is a file format and compression algorithm. It does not specify the protocol or algorithms necessary to take advantage of the features in a client/server architecture, for example. The standard is similar to the Flashpix file format standardized by a consortium of companies now called the Digital Imaging Group. For more information, see Digital Imaging Group, "The Flashpix image format," with a world wide web site at digitalimaging.org. Using the original JPEG file format, Flashpix is not as efficient as JPEG 2000. However, unlike JPEG 2000, Flashpix is paired with a protocol for interacting with images over the Internet called the Internet Imaging Protocol (IIP). For more information, see Digital Imaging Group, "The Internet Imaging Protocol."

SUMMARY OF THE INVENTION

In one embodiment, the system comprises a server and a client. The server stores a compressed codestream corresponding to image data. The client is coupled to the server via a network environment. The client includes a memory having an application and a data structure stored therein. The data structure identifies positions of packets of the compressed codestream on the server and identifies data of the compressed codestream already buffered at the client.

In one embodiment, the client requests bytes of the compressed codestream from the server that are not already stored in the memory and generates decoded image data requested by a user from the bytes of the compressed codestream requested from the server and any portion of the compressed codestream previously stored in the memory necessary to create the image data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
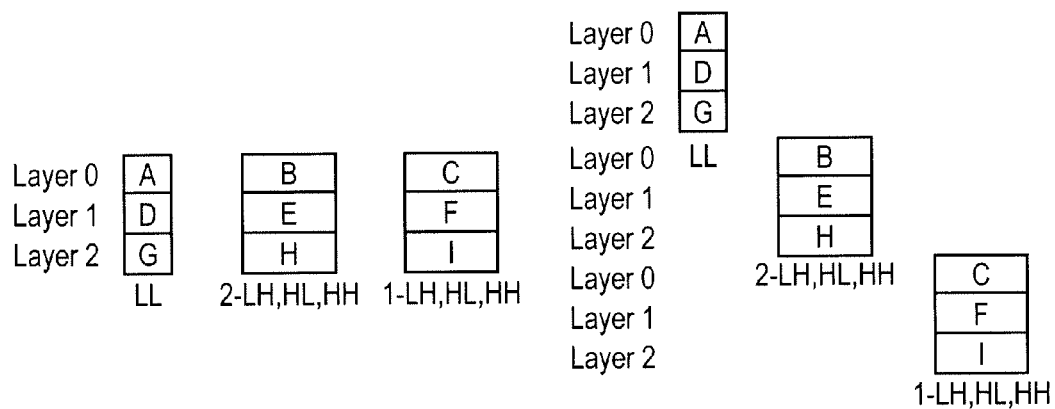
FIG. 1 illustrates packets arranged in a JPEG 2000 codestream (pixel fidelity order on left, resolution order on right).

A novel and useful system is described herein that includes a number of techniques for processing a JPEG 2000 or similar codestream in a client/server system. These include a data structure that tracks the length and location of every packet in the codestream both on the server and received by the client. In one embodiment, the JPEG 2000 TLM and PLM marker segments are used. Also included are interactive client/server protocol with clients making byte requests, and modifications of the Internet Image Protocol (IIP, owned by the Digital Imaging Group, a commercial consortium) for JPEG 2000.

The JPEG 2000 image compression system offers significant opportunity to improve imaging over the Internet. The JPEG 2000 standard is ideally suited to the client/server architecture of the web. With only one compressed version stored, a server can transmit an image with the resolution, quality, size, and region custom specified by an individual client. It can also serve an interactive zoom and pan client application. All of these can be achieved without decoding at the server while using only reduced, and potentially minimal, server computation, storage, and bandwidth.

The following description discusses some of the system issues involved in Internet imaging with JPEG 2000. The choices of the client, passing of control information, and the methods a server could use to serve the client requests are described herein. These issues include standard use of JPEG 2000 encoding and the decoding options.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The following description sets forth protocols and algorithms for interacting over a client/server network in processing a JPEG 2000 or similar codestream. A description of a networked environment is set forth, followed by descriptions of different environments where the computational burden is distributed differently between the client and server machines. In the first environment (referred to herein Smart Client, Challenged Server), the burden of computation is weighted toward the client. This is good for networks where the client is a powerful capable machine like a personal computer (PC) or a laptop. The second environment (referred to herein Smart Server, Challenged Client) offloads more of the computational burden from the client to the server. This is useful for less powerful machines such as cell phones, PDAs, etc. Note that a server could be designed to be capable of either model depending on the client's capability. Thus, heterogenous client devices can share a network and achieve just the correct level of server support.

Division of a JPEG 2000 Image

In JPEG 2000, a typical image consists one or more components (e.g. red, green, blue). Components are rectangular arrays of samples. These arrays are further divided into regular rectangular tiles. On a tile by tile basis the components can be decorrelated with a color space transformation. After color space transformation, every tile-component is compressed independently.

After each tile-component is transformed with a wavelet transformation. The multiple scale characteristic of the wavelet transformation provides groupings of coefficient data (LL subband, and HL, LH, HH subbands) capable of reconstructing the tile-component at different resolutions.

The coefficient subbands are further grouped into codeblocks (regular rectangular regions covering each subband). The bit planes, starting with by the most significant bit of each coefficient in the code-block, are coded using a context model and arithmetic coder. The coding produces several coding passes (up to three per bit plane) in order from the most significant to the least significant.

After all the coefficient data is coded the coding passes are arranged in packets. Each packet represents a collection of coding passes from some, or all of the code-blocks, at a given resolution and precinct, in a tile-component. In other words, a packet provides one unit of refinement for a given resolution within a tile-component. For each resolution in each tile-component, there is a strict order for the packets. However, the packets from different resolutions and tile-components can be interleaved in a variety of ways. The packet is the minimum unit of coded data that is easily accessible in the codestream.

FIG. 1 shows two examples of packets orders. On the left, the packet order is in pixel fidelity order (3 resolutions, 3 layers, one precinct, one tile-component). On the right, the packet order is resolution order (A, D, G, B, E, H, C, F, I).

The syntax of the codestream follows the division of the image. There is a main header at the beginning of the codestream. This header contains markers that describe the image characteristics and the coding style and other parameters that apply to the whole image or individual components. Each tile-part has a header. These tile-parts are indexed to indicate order. The first tile-part header of a tile contains information that applies to whole tile or individual tile-components. The remaining tile-part headers include only order and length information for that tile-part and/or succeeding tile-parts.

An Exemplary Network

Figure 2:
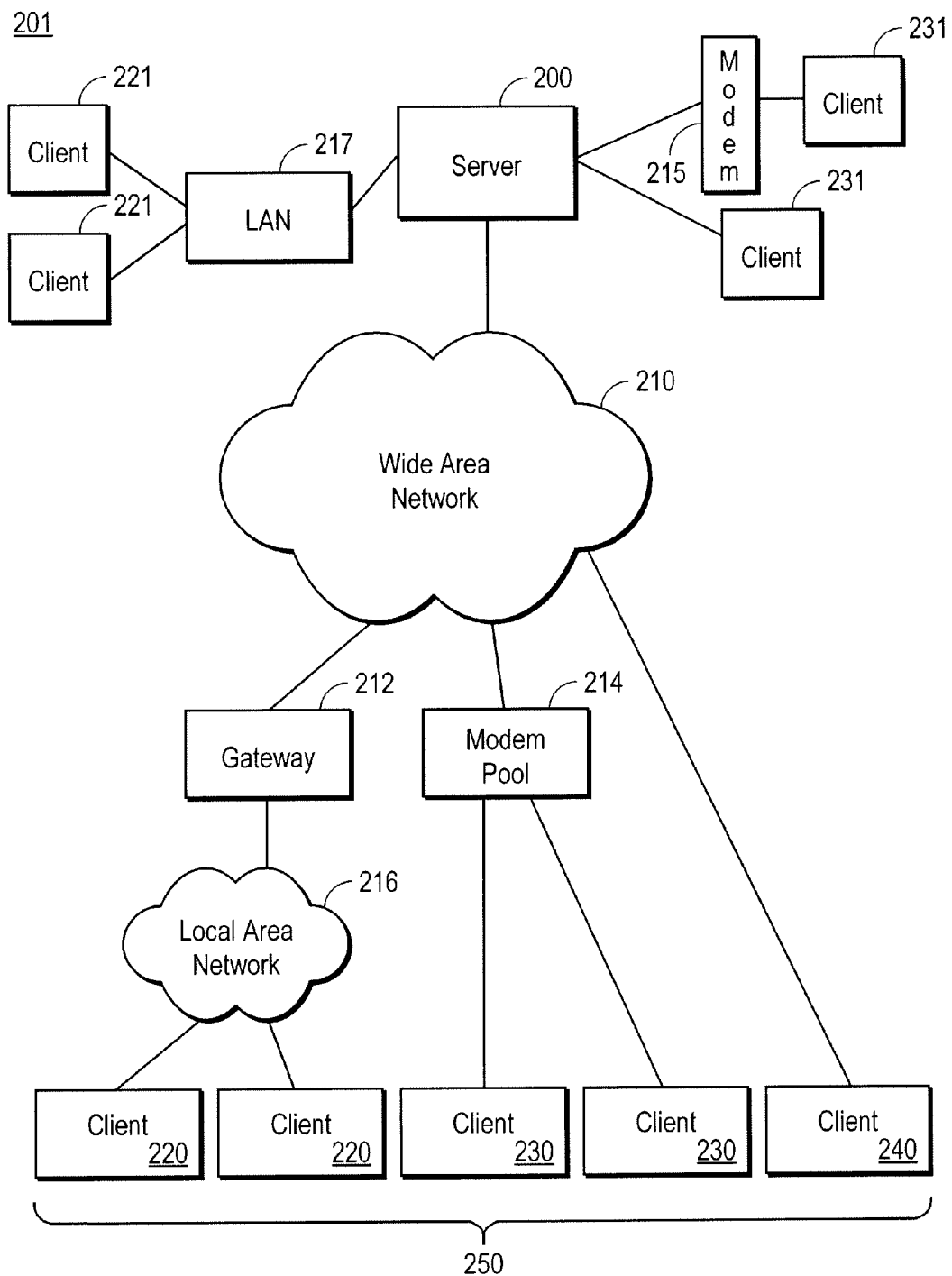
FIG. 2 illustrates an exemplary network environment.

FIG. 2 is a block diagram of one embodiment of a network environment 201 that may be used with the techniques described herein. In one embodiment, a server computer system 200 is coupled to a wide-area network 210. Wide-area network 210 may include the Internet or other proprietary networks including, but not limited to, America On-Line™, CompuServe™, Microsoft Network™, and Prodigy™. Wide-area network 210 may include conventional network backbones, long-haul telephone lines, Internet and/or Intranet service providers, various levels of network routers, and other conventional mechanisms for routing data between computers. Using network protocols, server 200 may communicate through wide-area network 210 to client computer systems 220, 230, 240, which are possibly connected through wide-area network 210 in various ways or directly connected to server 200. For example, client 240 is connected directly to wide-area network 210 through direct or dial-up telephone or other network transmission line. Client 240 may be connected to wide-area network 210 via a wireless connection.

Alternatively, clients 230 may be connected through wide-area network 210 using a modem pool 214. Modem pool 214 allows multiple client systems to connect with a smaller set of modems in modem pool 214 for connection through wide-area network 210. Clients 231 may also be connected directly to server 200 or be coupled to server through modem 215. In another alternative network typology, wide-area network 210 is connected to a gateway computer 212. Gateway computer 212 is used to route data to clients 220 through a local area network 216. In this manner, clients 220 can communicate with each other through local area network (LAN) 216 or with server 200 through gateway 212 and wide-area network 210. Alternatively, LAN 217 may be directly connected to server 200 and clients 221 may be connected through LAN 217.

Using one of a variety of network connection mechanisms, server computer 200 can communicate with client computers 250. In one embodiment, a server computer 200 may operate as a web server if the World-Wide Web ("WWW") portion of the Internet is used for wide area network 210. Using the HTTP protocol and the HTML coding language, or XML, such a web server may communicate across the World-Wide Web with a client. In this configuration, the client uses a client application program known as a web browser such as the Netscape™ Navigator™, the Internet Explorer™, the user interface of America On-Line™, or the web browser or HTML translator of any other conventional supplier. Using such browsers and the World Wide Web, clients 250 may access graphical and textual data or video, audio, or tactile data provided by the web server 200.

Smart Client, "Challenged" Server

In one embodiment, a client represents a smart terminal, such as a personal computer, that provides requests to a server to obtain some amount of data corresponding to an image. The data being requested is part of a codestream, such as a JPEG 2000 codestream, stored as a file at the server. The server receives the request for bytes for a particular file and transmits them to the client.

Figure 3:
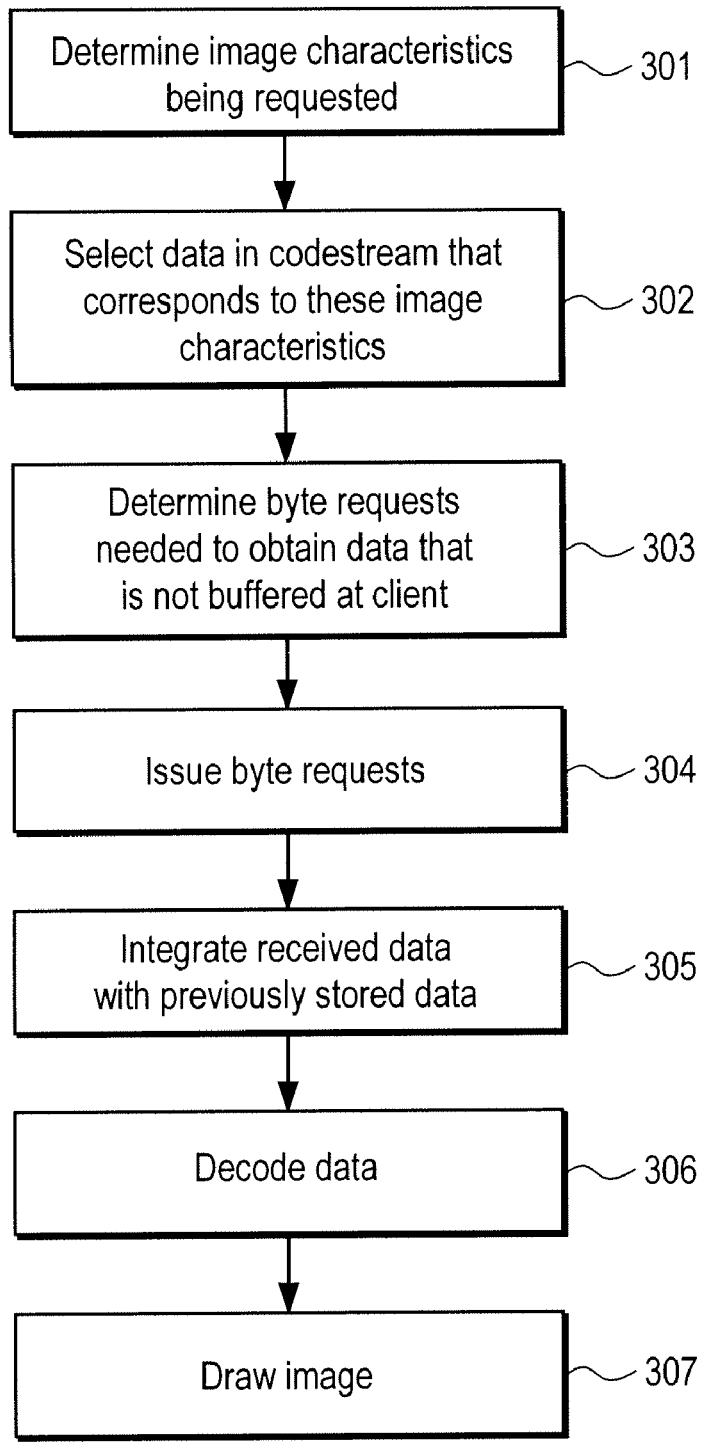
FIG. 3 illustrates a flow diagram of a process for processing a JPEG 2000 codestream.

FIG. 3 is one embodiment of a process performed by processing logic of the client (e.g., the client side application) to display an image requested by the user. With this process, a client side application is responsible for determining what data is needed and asking for the data from the server. The processing logic may comprise hardware (e.g., circuitry, dedicated logic, etc.), software (such as is run on a general purpose computer system or a dedicated machine), or a combination of both.

Referring to FIG. 3, processing logic determines the image characteristics that the user requests (processing block 301). These may include region, resolution, precinct and/or quality.

Next, processing logic selects the data of the JPEG 2000 codestream that corresponds to these image characteristics (processing block 302), and determines what byte requests are necessary to receive this data based on what is already buffered at the client (processing block 303). The client determines which packets it needs and which packets it already has in order to generate a request for the packets is still needs. The client initially begins with no packets and then as more requests are made, and as described in further detail below, the client retains packets of the codestream and stores them in a manner that provides the client easy access to the previously requested and obtained packets. In one embodiment, the client only retains packets for one type of interactive session. In one embodiment, this is performed using a data structure described below. However, this could be performed in a number of ways.

Using this information, processing logic issues byte range requests to the server (processing block 304). In one embodiment, the client specifies the data of the JPEG 2000 codestream that is needed by sending the starting point of the memory location at which the data is stored and the range of the amount of data that is requested. In an alternative embodiment, the starting and ending points of the memory locations storing the desired data are sent in the request.

In one embodiment, the user may use HTTP or a similar mechanism to obtain portions of the codestream which it desires. For example, the client may use POST or GET operations to request the information from the server. In an alternative embodiment, the client may specify the starting location (e.g., byte) and length or starting location (e.g., byte) and ending location (e.g., byte) (or multiple sequences of these) in a universal resource locator (URL).

Processing logic integrates the received data, which is sent in encoded format, with the previously buffered data to create a correct JPEG 2000 codestream (processing block 305). In one embodiment, the packets are put in the order they appear in the original codestream.

The marker segments in the JPEG 2000 codestream may be changed to create a legal codestream that a JPEG 2000 compliant decoder may be able to handle. More specifically, the markers associated with the original JPEG codestream stored on the server indicate a certain number of tiles and tile parts, etc. These markers are forwarded with the requested bytes of the codestream. (The server does not necessarily know that it is providing a JPEG 2000 file; it simply receives requests and sends bytes.) However, since only a portion of the codestream may have been requested, the client modifies the markers so that the markers are correct for the codestream that is generated as a result of the integration process. Thus, the client creates a correct, or legal, codestream. For example, when a thumbnail (lower resolution) version of a codestream is requested, the server provides the requested data. However, the PLM values provided in the main header are no longer correct. Since some packets which belong to the higher resolution are not included in the new codestream, the PLM values must be updated. Similarly, the Psot value (length from beginning of the first byte of the SOT (Start of tile-part) marker segment of the tile-part to the end of the data of that tile-part) of the SOT marker as well as the Ttlm and Ptlm values of the TLM marker must be updated to reflect the change.

Then processing logic decodes the newly generated JPEG 2000 codestream using a compliant JPEG 2000 decoder (processing block 306) and draws the image to the monitor (processing block 307).

The server services the request; however, the server need not have any special software for handling JPEG 2000 files. However, the control on the server (e.g., HTML or other control language) includes not only the file handle but a length of the main header as well. In response to the request, the server provides information to the client, including the requested bytes. In one embodiment, the server is able to serve byte length requests. This could be accomplished with a number of methods. In one embodiment, a Common Gateway Interface (CGI) script is used to extract a consecutive portion of a file and transmit it to the client. The CGI script determines the bytes to send, creates TCI/IP packets, and sends the created packets.

The client creates a legal JPEG 2000 codestream from the transmitted data packets and decodes them using a generic decoder. To do so, the client assembles the portion of the codestream it receives into a complete legal JPEG 2000 codestreams for the decoder. The decoder may comprise a generic software decoder. The generic decoder expects to have access to the entire codestream (i.e., a legal codestream). In an alternative embodiment, the decoder is able to process different portions of a codestream by skipping around memory. A stream filter may be included to filter the stream prior to it being decoded by the decoder.

In an alternative embodiment, the decoder is an enhanced decoder that is able to handle codestreams that are not in order and that may be spread out in storage. In such a case, the headers may indicate the location of each of the necessary parts spread out through the memory, preferably through the use of pointers.

In still another embodiment, a restricted decoder is used, such as a decoder that can understand only one of the JPEG 2000 progression orders. In such a case, the data that is requested and received from the server may have to be reordered before being sent to the decoder.

With respect to JPEG 2000, the JPEG 2000 file may have fully specified TLM and PLM marker segments. With these marker segments, the length and starting point of every packet in the codestream is known after the main header is received by the client. In an alternative embodiment, this information is discerned without these marker segments by reading every tile-part header and possibly every packet header—a procedure that would be less efficient.

In one embodiment, the image and the JPEG 2000 codestream include the following characteristics. The image size, tile size, tile-parts, number of resolutions, and the layering pattern are reasonable. That is, the image is large enough that interaction makes sense versus transmission of the entire image. For example, in one embodiment, a 1024×1024 pixel color image or larger is used. The tile size is large enough to preserve image quality but small enough to allow selection of small portions of the file, e.g., 256×256 is reasonable. There are not too many tile-parts, because too many tile-parts increases the size of the TLM marker segment. If the TLM is adding more than 5% to the image size, it is probably inefficient. (When too many tile-parts occurs, it is easier to download the entire image rather than pass the signaling data.) The number of resolutions allows small enough images to be extracted. For example, 4 to 6 decomposition levels might be reasonable to allow small enough images to be extracted. Also, the layering pattern includes a predictable, relatively equal distortion across the image. Preferably, it should also be fine enough to allow a good level of control over the rate yet not so fine as to create too many small packets. Small packets may not be the most efficient for access to the server and the number of packets increases the size of the PLM marker segment.

The client/server interaction may be more efficient if the JPEG 2000 files are originally encoded according to one or more of the suggestions below. In one embodiment, the file only contains one progression ordering (e.g., resolution level-layer-component-position), one partition, and COD, COC, QCD, and QCC marker segments only in the main header. The tile-part headers only contain SOT and SOS marker segments. The components of the image are all treated the same for the examples described herein. In theory, none of these assumptions are required for extracting the correct parts of the codestream. However, in practice these are useful for efficiency. Please note that that this organization of a JPEG 2000 codestream is quite common. Also note that no special use of the file format features of JPEG 2000 codestream is discussed herein as such would be well-known to one skilled in the art.

Retrieving the Information in the Main Header of the Codestream

Figure 4:
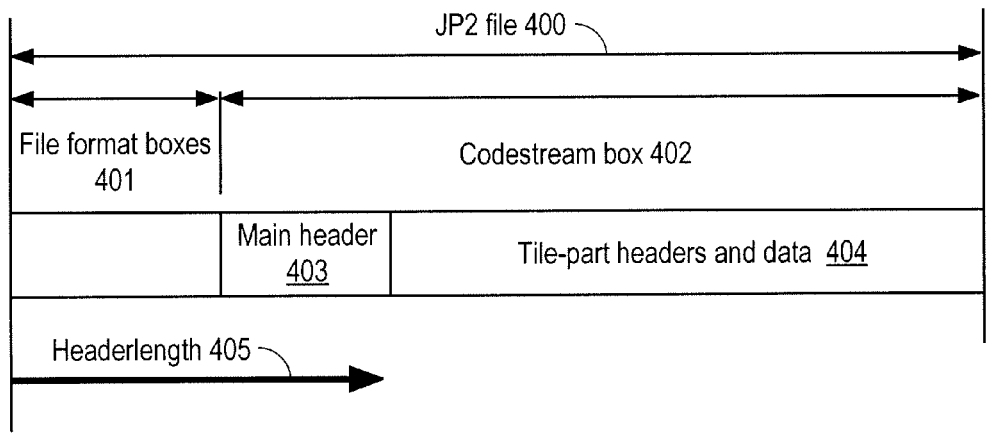
FIG. 4 illustrates a JP2 file with the length of the boxes preceding the codestream and the length of the main header denoted.

For a numerical example, the well-known Lena image is used with three components, four tiles (one tile-part per tile), three resolutions levels, and two layers. There are 72 packets (3×4×3×2=72). The browser application receives the filename and a length from the HTML source (e.g., a web page with the embedded image or a page with a link to the image). An XML source could be used as well. For example, in one embodiment, the format is the following:

<img src="lena.jp2"headerlength="309"> where the headerlength (309 in this example) corresponds to the data in the file format boxes in front of the codestream and the syntax main header of the codestream. FIG. 4 shows this file and the headerlength. Referring to FIG. 4, the JP2 file 400 includes file format boxes 401 and a codestream box 402. Codestream box 402 includes a main header 403 and tile-part headers and data 404. The headerlength 405 is equal to file format boxes 401 and main header 403. Note that FIG. 4 is not to scale.

The client makes a request to the server for the data corresponding the header length. In one embodiment, the request causes the server to call a CGI script on the server that streams only the bytes between the range requested. For example, syntax of this request could be the following:

cgiByteRequest:lena.jp2:0:309

The client reads the information in the file format boxes and uses it as necessary. In the case of a JPEG 2000 codestream, the main header of the codestream box includes two key marker segments useful for further interaction, the TLM and the PLM marker segments, in addition to the coding and quantization marker segments. Together these two marker segments provide a byte map to every packet. The packets are distinguished by tile, component, resolution, and layer.

For example, if an image has three components, is divided into four tiles (with one tile-part per tile), has three resolution levels (two wavelet decompositions), two layers, and only one partition per tile, then this image would have 72 packets and a packet represents one partition of one layer of one resolution of one tile-component. In this case, the TLM has the following values:

| | | |
|---|---|---|
| TLM->marker = | 0xFF55 | // marker number |
| TLM->Ltlm = | 24 | // length of the marker segment in bytes |
| TLM->Ztlm = | 0 | // index of this TLM marker segment |
| TLM->Stlm = | 0x50 | // setting for Ttlm as 8 bits and Ptlm as 32 bits |
| TLM->Ttlm$_0$ = | 0 | // tile 0 |
| TLM->Ptlm 0 = | 80,996 | // tile 0 length |
| TLM->Ttlm$_1$ = | 1 | |
| TLM->Ptlm$_1$ = | 74,474 | |

-continued

| | |
|---|---|
| TLM->Ttlm$_2$ = | 2 |
| TLM->Ptlm$_2$ = | 90,320 |
| TLM->Ttlm$_3$ = | 3 |
| TLM->Ptlm$_3$ = | 70,296 |

The PLM marker segment describes the length of the 72 packets as follows

| | | |
|---|---|---|
| PLM->marker = | 0xFF57 | // marker number |
| PLM->Lplm = | 157 | // length of the marker segment in bytes |
| PLM->Zplm = | 0 | // index of this PLM marker segment |
| PLM->Nplm$_0$ = | 38 | // number of bytes for the first tile-part in the // codestream, in this case tile 0 |
| PLM->Iplm$_{0,0}$ = | 1895 | // packet length |
| PLM->Iplm$_{0,1}$ = | 1802 | |
| ... | | |
| PLM->Iplm$_{0,17}$ = | 16438 | |
| ... | | |
| PLM->Nplm$_3$ = | 37 | // number of bytes for the fourth tile-part in // the codestream, in this case tile 3 |
| PLM->Iplm$_{3,0}$ = | 1994 | // packet length |
| PLM->Iplm$_{3,1}$ = | 1853 | |
| ... | | |
| PLM->Iplm$_{3,17}$ = | 18,031 | |

Figure 5:
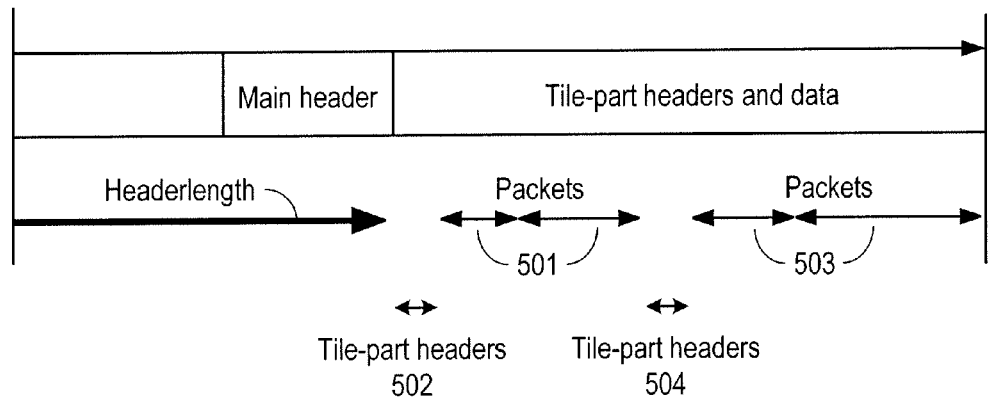
FIG. 5 illustrates the location of the packets in a JPEG 2000 codestream.

The starting points of each packet can be discerned with the information now available at the client. The starting point of the first tile is known from the headerlength value in the script that calls out the image. From that, the location of all the tile-parts are known. FIG. 5 shows an example with two tile-parts and two packets per tile-part. Referring to FIG. 5, packets 501 are packets associated with tile-part headers 502 and packets 503 are packets associated with tile-part header 504.

In one embodiment, the tile-part headers only have SOT and SOS marker segments. Thus, the start of the first packet is 12 bytes after the start of the tile-part. (If the length of the tile-part header was not known it could be deduced by subtracting the sum of the packet lengths in the tile-part from the length of the tile-part.)

From this information, and the known order of the packets, the exact location and length of each packet is known. The client can create a data structure that lists the locations of all the packets on the server side and relates that to data that has been received on the client side. For the above example, the data structure might contain the data in Table 1. Note that this information can be generated regardless of the number of tile-parts for a given tile or the order in the codestream.

TABLE 1

Data Structure to Determine the Position of Packets on Both the Server and the Client

| Tile | Resolution | Layer | Component | Precinct | Server start offset | Packet length | Client start offset |
|---|---|---|---|---|---|---|---|
| 0 | 0 | 0 | 0 | 0 | 323 | 1895 | null |
| 0 | 0 | 0 | 1 | 0 | 2218 | 1802 | null |
| 0 | 0 | 0 | 2 | 0 | 4020 | 1658 | null |
| 0 | 0 | 1 | 0 | 0 | 5678 | 1608 | null |
| ... | | | | | | | |
| 3 | 2 | 1 | 0 | 0 | 274,063 | 9811 | null |
| 3 | 2 | 1 | 1 | 0 | 283,874 | 14,490 | null |
| 3 | 2 | 1 | 2 | 0 | 298,364 | 18,031 | null |

In one embodiment, multiple client applications requesting data from the server utilize the table and the image data is stored as indicated by the table. In such a case, the client may include the cache manager that manages the JPEG 2000 images and any requests by a web browser for such an image is first checked in the table to see if it is present. Thus, the table may be a shared resource shared between a number of applications.

Determining the Data to Request

In one embodiment, the three main image requests that the user can control are region (which tiles), size (resolution), and quality or speed (layers). The user may indicate to the client the portion of a particular image they wish to view through a user interface. In response to the indication, the client generates a request to the server to obtain the portion of the codestream that it does not have that corresponds to the requested image data. The user interface allows an image to be selected in a particular size, bit rate, or region to be chosen.

In one embodiment, the user interface may comprise a web site with a series of thumbnails from which the user may select with a cursor control device. In such a case, the user causes the request to a server by selecting one or more of the images (e.g., clicking on one or more of the images) to obtain an image of greater size. The selection is received by a browser application on the client, which generates the request.

In an alternative embodiment, the client may utilize a double click to specify their request. In still another embodiment, a box may appear on the screen that requests vertical and horizontal dimensions or DPI that a user may indicate a portion of an image that they wish to view. In yet another embodiment, a slide bar may appear on the screen. The slide bar may be a quality slide bar that allows the user to specify the quality of the image that is to be displayed. In another embodiment, a set of buttons may be used to make the request. In another embodiment, the user draws a rectangle on the screen to specify the region of an image they wish to view at a different level of resolution. In still another embodiment, an algorithm may be used to find a particular location on a page, such as, by searching for particular text or a graphic that appears in the image. In still another embodiment, simply rolling a mouse over and highlighting a portion of the image causes the client to generate a request associated with that highlighted region.

In one embodiment, no user interface is utilized at all. For example, inside an HTML page, a designer may have predetermined the size of image that is going to be supplied to the user. Therefore, when the user loads a page containing an image the size of the image is at a specified or preset rate.

Data Request, Receiving, and Merging

In one embodiment, a CGI script is used to process the request. First, the correct packets are requested. Next, the client receives packets and merges streams. That is, the client combines the packets received from the server in response to the request with those previously stored on the client. This is performed using the Client start offset column of Table 1.

The processing continuously changes the data structure as the new data is received or near in time thereafter. In this way, the data structure provides an accurate indication of which portions of a JPEG 2000 codestream are buffered by the client. Thereafter, when a second request occurs, the new data is merged.

Smart Server, "Challenged" Client

The Internet Imaging Protocol (IIP) provides a definition of client server communication for the exchange of image data. It was primarily designed to take advantage of the Flashpix file format in a networked environment. Since Flashpix was designed to store multiple resolutions of an image using compressed 64×64 tiles, it may be adapted to use with a JPEG 2000 codestream.

In fact, the IIP could be used to serve JPEG 2000 images without any changes whatsoever to the protocol or the client, if the server converts all requested tiles to the JPEG DCT compression method as they were requested. This allows the server to realize the compression savings provided by JPEG 2000's ability to store multiple resolutions in one file, but it would not provide any transmission time savings and suffers from processing time to recompress portions of the image and suffers from reduced quality due to JPEG compression. In such a case, the client has the capability to decode JPEG DCT compression.

A more useful approach is to amend the IIP specification to allow JPEG 2000 as a native compression type. This is a trivial modification as far as the protocol is concerned. Unfortunately, because Flashpix uses fixed size tiles (64 by 64) which are the same size on every resolution level, and JPEG 2000 uses arbitrary sized tiles which change with each resolution level (and thus maintain the same number of tiles on each resolution level), substantial changes to both the client and the server would be necessary to implement the new compression type.

An example of an IIP exchange is as follows from Annex 1 of Version 1.0.5 of the specification:

The client provides the following:

```
FIF=Moon.fpx&OBJ=IIP,1.0&OBJ=IIP,1.0&         //client specifies user of IIP
                                              //protocol version 1.
OBJ=Basic-info&OBJ=Comp-group,2,*&OBJ=Title   //client requests
                                              //basic info about
                                              //compression Group
                                              //2 in the codestream
```

In response, the server provides:

```
IIP:1.0CRLF                                   //indicates server is using IIP 1.0
IIP-server:0.0CRLF                            //server indicated its server 0.0
Max-size:1000 1000CRLF                        //specifies maximum resolution
Resolution-number:5CRLF                       //specifies resolution number of
                                              //image as part of basic info
Colorspace,0-4,0:0 0 3 3 0 1 2CRLE            //specifies color space of image as
                                              //part of basic info
ROI:0 0 1.5 1.CRLF                            //specifies region of intent of
                                              //interest
Affine-transform:0.86-0.49 0 0.35 0.49 0.86 0-0.3 0 0 1 0 0 0 0 1 CRLF
                                              //specifies transform
Aspect-ratio:1.5CRLF                          //specifies aspect ratio
Error/19:3 3 Filtering-valueCRLF              //specifies no filtering
Error/15:3 3 Color-twistCRLF                  //specifies no color twist
Error/19:3 3 Contrast-adjustCRLF              //specifies no color adjust
Comp-group,2,0/785:dataCRFL                   //server sending back
                                              //compression group 2 + 785 bytes
                                              //of data
Title/38:the moon in the skyCRLF              //server sends back title
```

Then the client provides:

```
FIF=Moon.fpx&OBJ=IIP,1.0&TIL=2,44&TIL=3,0-1   //client specifies that
                                              //it wants tile at
                                              //resolution 2, tile
                                              //44; and at
                                              //resolution 3, tiles 0-
                                              //1.
``` and the server responds by sending the requested data:

```
IIP:1.0CRLF
Tile,2,44,0/12296:dataCRLF                    //server sends tile at resolution 2,
                                              //its tile number is 44 and there are
                                              //12296 bytes of data.
Tile,3,0,0/980:dataCRLF
Tile,3,1,0/1011:dataCRLF
```

As described above, the first request from the client asks for some fundamental information about the flashpix file. The server responds with several items including an indication that the "Filtering-value," "Color-twist," and "Contrast-adjust" are unavailable. Importantly, the client learns the image size and the maximum number of resolutions. The client then requests one tile at resolution 2 and two tiles (0 and 1) at resolution 3. In one embodiment, the server provides an initial HTML, XML or similar file, and then starts the IIP process. From this file, the client could ascertain the image size and maximum number or resolutions. In this manner, one round trip communication between the server and the client could be avoided.

Note that because Flashpix stores resolutions independently, there is no need to track transmission of lower resolution portions of an image. In one embodiment, a data structure at the server similar to Table 1 is used in which the server stores an indication of what portions of a JPEG 2000 codestream are stored at the client.

In one embodiment, with JPEG 2000, the interaction might be very similar. First, a client asks for fundamental information. If that information is included in the JPEG 2000 main header (or even just the SIZ tag), the client then determines which tiles to request. Unlike Flashpix, the same tiles may be requested for the same portion of the image regardless of the resolution. Note that for some JPEG 2000 files, the maximum resolution may not be defined because the number of resolutions can vary on a tile-by-tile basis; however, in one embodiment, for purposes herein the system is limited to codestreams which do not contain COD or COC makers in the tile part headers as may be defined as a "profile" for some applications.

Given a request for Tile 0, at resolution 2, the server parses the JPEG 2000 codestream and locates all packets relevant to the request. These are all packets for the requested tile at a resolution less than or equal to the resolution requested and all layers. The definition of the tile object returned by a IIP server when using JPEG 2000 could be either all resolutions up to and including the named resolution or only the named resolution. In the second case, the following exchange might occur:

From the client:
FIF=Moon.fpx&OBJ=IIP,1.0&TIL=2,4
From the server:
IIP:1.0CRLF
Tile,0,4,0/597:dataCRLF
Tile,1,4,0/2296:dataCRLF
Tile,2,4,0/6296:dataCRLF Of course, using IIP in this way limits the selection of portions of the bitstream to only resolution and spatial region. In one embodiment, the tile request syntax is:

TIL=res,tile[,sub]

For full use of JPEG 2000, this syntax could be modified to

TIL=res,comp,lay,prec,tile where res is the resolution as currently defined, comp is the component, lay is the JPEG 2000 layer, and prec is the JPEG 2000 precinct. Example ranges include (0-2), or wildcards "*," could be used for any of the parameters.

Thus a client request might be the following:
=>
TIL=0-2,*,0-1,*,5 to obtain all components and all precincts for the first 3 resolutions of the 5th tile, but only get the first 2 layers which could reduce the required bitrate substantially.

An Exemplary Computer System

Figure 6:
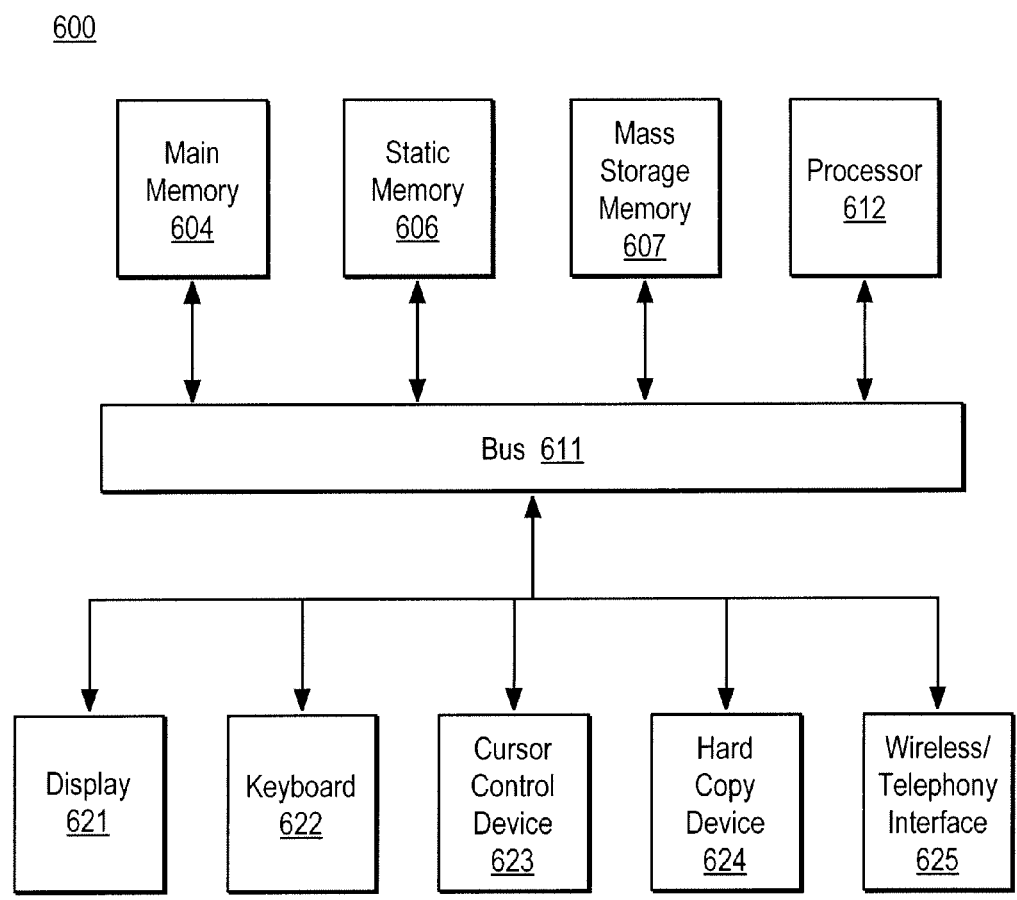
FIG. 6 is a block diagram of one embodiment of a computer system.

FIG. 6 is a block diagram of an exemplary computer system that may perform one or more of the operations described herein. Referring to FIG. 6, computer system 600 may comprise an exemplary client 650 or server 600 computer system. Computer system 600 comprises a communication mechanism or bus 611 for communicating information, and a processor 612 coupled with bus 611 for processing information. Processor 612 includes a microprocessor, but is not limited to a microprocessor, such as, for example, Pentium™, PowerPC™, Alpha™, etc.

System 600 further comprises a random access memory (RAM), or other dynamic storage device 604 (referred to as main memory) coupled to bus 611 for storing information and instructions to be executed by processor 612. Such instructions may be those which when executed by processor 612 cause the operation of the client and/or server to be performed. Main memory 604 also may be used for storing temporary variables or other intermediate information during execution of instructions by processor 612.

Computer system 600 also comprises a read only memory (ROM) and/or other static storage device 606 coupled to bus 611 for storing static information and instructions for processor 612, and a data storage device 607, such as a magnetic disk or optical disk and its corresponding disk drive. Data storage device 607 is coupled to bus 611 for storing information and instructions.

Computer system 600 may further be coupled to a display device 621, such as a cathode ray tube (CRT) or liquid crystal display (LCD), coupled to bus 611 for displaying information to a computer user. An alphanumeric input device 622, including alphanumeric and other keys, may also be coupled to bus 611 for communicating information and command selections to processor 612. An additional user input device is cursor control 623, such as a mouse, trackball, trackpad, stylus, or cursor direction keys, coupled to bus 611 for communicating direction information and command selections to processor 612, and for controlling cursor movement on display 621.

Another device that may be coupled to bus 611 is hard copy device 624, which may be used for printing instructions, data, or other information on a medium such as paper, film, or similar types of media. Furthermore, a sound recording and playback device, such as a speaker and/or microphone may optionally be coupled to bus 611 for audio interfacing with computer system 600. Another device that may be coupled to bus 611 is a wired/wireless communication capability 625 to communication to a phone or handheld palm device.

Note that any or all of the components of system 600 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A client computer system for processing codestreams, the client computer system comprising:
a memory having an application and a data structure stored therein, wherein the data structure identifies positions of compressed codestream on a server and identifies data of the compressed codestream already buffered at the client; and
a processor coupled to the memory to execute the application to generate a request for portions of the compressed codestream that are not already stored in the memory from the server based on indications of which portions of the codestream are already stored in the memory as indicated by the data structure, wherein size of the requested portions is determined based on at least two of resolution, layer, component, and precinct of an image specified by a user of the client, and wherein the size of the requested portion is derived from the data structure of the client corresponding to the user specified at least two of resolution, layer, component, and precinct of the image,
wherein the processor, prior to decoding, integrates previously buffered portions of the compressed codestream with portions of the compressed codestream received as a result of the request to create a new codestream having markers by putting packets in the order the packets appeared in the compressed codestream and by updating the codestream markers to reflect that the previously buffered portions of the compressed codestream and the portions of the compressed codestream received as a result of the request are parts of the new codestream,
wherein the client to generate image data by decoding the new codestream,
wherein the codestream markers include a Tile Length Marker (TLM) and Packet Length Marker (PLM) that provide a byte map to each of the packets, each of the packets being distinguishable by tile, component, resolution, and layer, wherein the processor adjusts values of at least the TLM and PLM markers to reconstruct the compressed codestream from a non-JPEG 2000 compliant format to the new JPEG 2000 compliant codestream, including adjusting the TLM and PLM markers to be compatible with corresponding markers of the JPEG 2000 standard, so that an ordinary JPEG 2000 decoder can be invoked to decode the new codestream if the portions of the compressed codestream received as a result of the request are not JPEG 2000 compliant.

2. A network system for processing codestreams in a client-server configuration, the network system comprising:
a server to store a compressed codestream corresponding to image data; and
a client coupled to the server via a network environment, wherein the client includes a memory having an application and a data structure stored therein, wherein the data structure identifies positions of the compressed codestream on the server and identifies data of the compressed codestream already buffered at the client, and further wherein the client operates to request bytes of the compressed codestream from the server that are not already stored in the memory and generate a new codestream from the bytes of the compressed codestream requested from the server and portion of the compressed codestream previously stored in the memory necessary to create the image data;
prior to decoding, the client integrates already buffered portions of the compressed codestream with portions of the compressed codestream received as a result of the request to create a new codestream having markers, the new codestream generated by putting packets in the order the packets appeared in the compressed codestream and by updating codestream markers to reflect that the bytes of the compressed codestream requested from the server and portion of the compressed codestream previously stored in the memory necessary to create the image data are parts of the new codestream, the client to generate image data by decoding the new codestream, wherein size of the requested bytes is determined based on at least two of resolution, layer, component, and precinct of an image specified by a user of the client, and wherein the size of the requested portion is derived from the data structure of the client corresponding to the user specified at least two of resolution, layer, component, and precinct of the image,
wherein the codestream markers include a Tile Length Marker (TLM) and Packet Length Marker (PLM) that provide a byte map to each of the packets, each of the packets being distinguishable by tile, component, resolution, and layer, wherein the processor adjusts values of at least the TLM and PLM markers to reconstruct the compressed codestream from a non-JPEG 2000 compliant format to the new JPEG 2000 compliant codestream, including adjusting the TLM and PLM markers to be compatible with corresponding markers of the JPEG 2000 standard, so that an ordinary JPEG 2000 decoder can be invoked to decode the new codestream if the portions of the compressed codestream received as a result of the request are not JPEG 2000 compliant.

3. The system defined in claim 2 wherein the portions of the compressed codestream are selected from a group consisting of packets, tile pads, and coded data segments from a codebook.

4. The system defined in claim 2 wherein, when executing the application, the client
determines image characteristics that a user requests,
selects data of a compressed codestream that corresponds to the image characteristics,
determines data of a compressed codestream that corresponds to the image characteristics that is not already buffered at the client,
issues requests to the server to obtain the data of a compressed codestream that corresponds to the image characteristics that is not already buffered at the client,
integrates data received from the server with any previously buffered data of the compressed codestream that corresponds to the image characteristics,
decodes the data of the compressed codestream that corresponds to the image characteristics, and
displays an image corresponding to the decoded compressed codestream.

5. The system defined in claim 2 wherein the server serves byte requests.

6. The system defined in claim 2 wherein the client further comprises a software decoder, and the client creates the compressed codestream for the software decoder by integrating bytes requested with previously obtained bytes.

7. The system defined in claim 2 wherein the client determines the location and length of each packet.

8. The system defined in claim 2 wherein the compressed codestream comprises a JPEG 2000 codestream.

9. The system defined in claim 7 wherein the client requests a headerlength of a compressed file from the server that includes one or more file format boxes and a main header of the codestream box from which the client determines the location and length of each packet.

10. The system defined in claim 9 wherein the main header includes two marker segments indicative of a map to every packet.

11. The system defined in claim 9 wherein the server comprises a script that streams only requested bytes to the client that are in a range specified in the request.

12. The system defined in claim 10 wherein the two marker segments comprise the TLM and PLM marker segments.

13. A method for processing image data by a client, the method comprising:
  determining image characteristics that a user requests, the image characteristics including at least two of resolution, layer, component, and precinct of an image specified by the user;
  selecting data of a compressed codestream that corresponds to the image characteristics;
  determining data of a compressed codestream that corresponds to the image characteristics that is not already buffered at the client, size of the determined data being determined based on the determined image characteristics, wherein the determining the data of a compressed codestream comprises using a data structure that identifies positions of portions of the compressed codestream on a server and that identifies data of the compressed codestream already buffered at the client, and wherein the data of the compressed codestream that corresponds to the image characteristics that is not already buffered at the client is derived from, the data structure of the client corresponding to the user specified at least two of resolution, layer, component, and precinct at of the image;
  issuing requests to the server to obtain the data of a compressed codestream that corresponds to the image characteristics and that is not already buffered at the client;
  prior to decoding, integrating the data of a compressed codestream received as a result of the request with the previously buffered data of the compressed codestream that corresponds to the image characteristics to create a new codestream having markers that reflect both data of a compressed codestream received from the server and the previously buffered data of the compressed codestream that corresponds to the image characteristics are included in the new codestream,
  wherein the markers include a Tile Length Marker (TLM) and Packet Length Marker (PLM) that provide a byte map to each of the packets, each of the packets being distinguishable by tile, component, resolution, and layer, including adjusting values of at least the TLM and PLM markers to reconstruct the compressed codestream from a non-JPEG 2000 compliant format to the new JPBG 2000 compliant codestream, including adjusting the TLM and PLM markers to be compatible with corresponding markers of the JPEG 2000 standard, so that an ordinary JPEG 2000 decoder can be invoked to decode the new codestream if the portions of the compressed codestream received as a result of the request are not JPEG 2000 compliant;
  decoding according to the JPEG 2000 standard the data of the new codestream that corresponds to the image characteristics; and
  displaying an image corresponding to the decoded new codestream.

14. The method defined in claim 13 further comprising the server serving byte requests.

15. The method defined in claim 13 further comprising compiling the compressed codestream for a software decoder on the client.

16. The method defined in claim 13 further comprising determining the location and length of each packet.

17. The method defined in claim 13 wherein the compressed codestream comprises a JPEG 2000 codestream.

18. The method defined in claim 16 further comprising requesting a headerlength of a compressed file from the server that includes one or more file format boxes and a main header of the codestream box from which the client determines the location and length of each packet.

19. The method defined in claim 18 wherein the main header includes two marker segments indicative of a byte map to every packet.

20. The method defined in claim 19 wherein the two marker segments comprise the TLM and PLM marker segments.

21. A computer storage medium having executable instructions stored thereon those, when executed by a client computer system cause the client computer system to:
  determine image characteristics that a user requests, the image characteristics including at least two of resolution, layer, component, and precinct of on image specified by the user;
  select data of a compressed codestream that corresponds to the image characteristics;
  determine data of a compressed codestream that corresponds to the image characteristics that is not already buffered at the client, wherein size of the determined data being determined being based on the determined image characteristics, wherein the determining the data of a compressed codestream comprises using a data structure that identifies positions of portions of the compressed codestream on a server and that identifies data of the compressed codestream already buffered at the client, wherein the data of the compressed codestream that corresponds to the image characteristics that is not already buffered at the client is derived from the data structure of the client corresponding to the user specified at least two of resolution, layer, component; and precinct of the image;
  issue requests to the server to obtain the data of a compressed codestream that corresponds to the image characteristics and that is not already buffered at the client;
  prior to decoding, integrate data of a compressed codestream received as a result of the request with the previously buffered data of the compressed codestream that corresponds to the image characteristics to create a new codestream having markers that reflect both data received from the server and the previously buffered data of the compressed codestream that corresponds to the image characteristics are included in the new codestream,
  wherein the markers include a Tile Length Marker (TLM) and Packet Length Marker (PLM) that provide a byte map to each of the packets, each of the packets being distinguishable by tile, component, resolution, and layer, including values of at least the TLM and PLM markers to reconstruct the compressed codestream from a non-JPEG 2000 compliant format to the new JPEG 2000 compliant codestream, including adjusting the TLM and PLM markers to be compatible with corresponding markers of the JPEG 2000 standard, so that an ordinary JPEG 2000 decoder can be invoked to decode the new codestream if the portions of the compressed codestream received as a result of the request are not JPEG 2000 compliant;
  decode the data of the new codestream that corresponds to the image characteristics;

display an image corresponding to the decoded new codestream.

22. A computer storage medium defined in claim 21 further comprising instructions which, when executed by the system, cause the system to create the compressed codestream for a software decoder on the client.

23. A computer storage medium defined in claim 21 further comprising instructions which, when executed by the system, cause the system to determine the location and length of each packet.

24. A computer storage medium defined in claim 21 wherein the compressed codestream comprises a JPEG 2000 codestream.

25. A computer storage medium defined in claim 23 further comprising instructions which, when executed by the system, cause the system to request a headerlength of a compressed file from the server that includes one or more file format boxes and a main header of the codestream box from which the client determines the location and length of each packet.

26. A computer storage medium defined in claim 25 wherein the main header includes two marker segments indicative of a bytemap to every packet.

27. A computer storage medium defined in claim 26 wherein the two marker segments comprise the TLM and PLM marker segments.

* * * * *

UNITED STATES PATENT AND TRADEMARK OFFICE
CERTIFICATE OF CORRECTION

PATENT NO. : 7,581,027 B2 Page 1 of 1
APPLICATION NO. : 09/894524
DATED : August 25, 2009
INVENTOR(S) : Boliek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this

Fourteenth Day of September, 2010

David J. Kappos
*Director of the United States Patent and Trademark Office*